(12) United States Patent
Yokoyama et al.

(10) Patent No.: US 8,247,762 B2
(45) Date of Patent: Aug. 21, 2012

(54) SELECTIVE MOLECULAR EXCITATION METHOD AND ISOTOPE SEPARATION METHOD USING THE SAME, ISOTOPE ANALYSIS METHOD, SELECTIVE MOLECULAR EXCITATION APPARATUS AND ISOTOPE SEPARATION APPARATUS

(75) Inventors: Keiichi Yokoyama, Kyoto (JP); Leo Matsuoka, Kyoto (JP); Hiroshi Akagi, Kyoto (JP); Tatsuya Kasajima, Kyoto (JP); Masaaki Tsubouchi, Kyoto (JP); Atsushi Yokoyama, Kyoto (JP)

(73) Assignee: Japan Atomic Energy Agency, Ibaraki (JP)

( * ) Notice: Subject to any disclaimer, the term of this patent is extended or adjusted under 35 U.S.C. 154(b) by 142 days.

(21) Appl. No.: 12/923,444

(22) Filed: Sep. 22, 2010

(65) Prior Publication Data

US 2011/0073755 A1 Mar. 31, 2011

(30) Foreign Application Priority Data

Sep. 25, 2009 (JP) .................. 2009-220818

(51) Int. Cl.
*B01D 59/00* (2006.01)
(52) U.S. Cl. ...................... 250/282; 250/281

(58) Field of Classification Search .................. 250/281, 250/282, 283, 290, 292, 293
See application file for complete search history.

(56) References Cited

FOREIGN PATENT DOCUMENTS

| JP | 06-134262 | 5/1994 |
|---|---|---|
| JP | 07-024262 | 1/1995 |
| JP | 2000-180241 | 6/2000 |

*Primary Examiner* — Michael Maskell
*Assistant Examiner* — Hanway Chang
(74) *Attorney, Agent, or Firm* — Paul F. Neils, Esq.; Edwards Neils PLLC (57) ABSTRACT

Molecules of a specific species can be selectively excited among molecules of a plurality of species that show only a slight difference of mass. Energy levels can be displayed on a graph where the horizontal axis indicates excitation energy. Assume an instance where an electromagnetic wave showing a comb-shaped spectrum having a plurality of narrow bands as indicated by P1 through P14 and tuning with excitation energies corresponding to the rotational levels of molecule X is irradiated onto the molecule X. The molecule X can sequentially make transitions to higher energy levels by using an electromagnetic wave showing such a comb-shaped spectrum. The energy levels of molecule Y are not synchronized with the comb-shaped spectrum. The two ranges of Y4 through Y7 and Y12 through Y15 operate as gates and the molecule Y cannot make transition from a rotational level to another when a gate is found between them.

15 Claims, 7 Drawing Sheets

SELECTIVE MOLECULAR EXCITATION METHOD AND ISOTOPE SEPARATION METHOD USING THE SAME, ISOTOPE ANALYSIS METHOD, SELECTIVE MOLECULAR EXCITATION APPARATUS AND ISOTOPE SEPARATION APPARATUS

CROSS-REFERENCE TO RELATED APPLICATIONS

The present application claims priority from Japanese Patent Application No. 2009-220818, filed Sep. 25, 2009, the contents of which are herein incorporated by reference in their entirety.

BACKGROUND OF THE INVENTION

1. Field of the Invention

The present invention relates to a method of selectively exciting molecules of a specific species by means of an electromagnetic wave, a method of separating an isotope by using this method and a method of analyzing an isotope. This invention also relates to a selective molecular excitation apparatus and an isotope separation apparatus.

2. Description of the Related Art

Different isotopes of an element have substantially same chemical properties but show a slight difference of mass. Therefore, a specific isotope can hardly be separated from them by way of an ordinary chemical separation method and a special technique is required to separate it. As such a technique, it is known to selectively excite molecules of a specific species including a specific isotope by conducting a particular treatment on a sample and utilize the difference of state in the treated molecules. For instance, ionized atoms are separated from the excited molecules by irradiating the treated sample with an ionizing laser beam so that they can be separated by an electric method with ease. Then, a technique of selectively exciting molecules of a specific species out of a mixture of molecules of various different species takes a vital role.

There is such a known technique of utilizing the energy difference in a state of molecular vibration (an isotope shift) attributable to a slight difference of mass among molecules including different isotopes. With the technique, only molecules of a specific species including isotopes are selectively excited by irradiating a sample with a laser beam having a spectral bandwidth that is sufficiently narrower than the isotope shift. Such selective excitation is difficult when the absorption spectrum of the molecules tends to broaden. Patent Document 1 describes a technique of suppressing the broadening of an absorption spectrum by cooling molecules to a very low temperature.

Similarly, various techniques of efficiently conducting an operation of selectively exciting molecules of a specific species including isotopes by utilizing an isotope shift have been proposed. For example, Patent Document 2 describes a technique of raising the excitation efficiency by sweeping the wavelength of a laser beam. Patent Document 3 describes a technique of raising the excitation efficiency by using a plurality of laser beams of different wavelengths, adjusting the absorption timings of the light beams and utilizing multi-photon absorption.

[Citation List]
[Patent Document]
[Patent Document 1] Jpn. Pat. Appln. Publication No. 2000-180241
[Patent Document 2] Jpn. Pat. Appln. Publication No. H06-134262
[Patent Document 3] Jpn. Pat. Appln. Publication No. H07-024262

While the technique described in Patent Document 1 can raise the efficiency of selective excitation by suppressing the broadening of an absorption spectrum, it requires a complex treatment process to make it difficult to actually improve the treatment speed because the sample needs to be cooled to a very low temperature. On the other hand, the techniques of Patent Documents 2 and 3 cannot avoid lowering of the efficiency of selective excitation due to a broadening in absorption spectrum.

Furthermore, the rotational quantum number J that defines the actual state of rotation of molecules in a substance varies broadly. Generally, molecules are thermally distributed and hence J of the molecules in a sample shows a certain distribution. Transitions of J take place only in the range of $\Delta J = \pm 1$ and the energy required for the transition varies as a function of J. When a monochromatic light beam is employed, it can excite only molecules having a specific J. Particularly, when the mass of a molecule (atom) is large, the rotation and vibration frequency of the molecule is small and the density of energy levels thereof rises. For example, rotational quantum numbers not less than 500 and vibrational quantum numbers not less than 20 are significantly observed in molecules of cesium iodide (CsI) at temperature of 1,000K and hence are distributed. Therefore, when a monochromatic light beam is employed, only a single quantum state can be excited out of about $500 \times 20 = 10,000$ quantum states. In other words, the efficiency of excitation is very low. Otherwise, it is only possible to look into the states of molecules (the distribution of J) in molecules of the substance to be treated in advance and selecting a wavelength for a laser beam accordingly.

Thus, it has been difficult to selectively excite molecules of a specific species among molecules of a plurality of species that show only a slight difference of mass.

SUMMARY OF THE INVENTION

In view of the above-identified problems, it is therefore the object of the present invention to provide a technique that can dissolve the problems of the prior art.

According to the present invention, the object of the invention is achieved in a manner as described below.

In an aspect of the present invention, there is provided a selective molecular excitation method of irradiating a gas with excitation light to selectively excite the molecules of a specific species in the gas, said method comprising: making the spectrum of excitation light a comb-shaped spectrum of a plurality of bands in an energy range so selected in advance as to include a plurality of excitation energies corresponding respectively to a plurality of rotational levels of the molecules of the specific species and the molecules other than the molecules of the specific species in the gas, the plurality of bands being so selected as to make all the excitation energies of the molecules of the specific species existing in the energy range to be included in the plurality of bands but some of the excitation energies of the molecules other than the specific species existing in the energy range to be not included in the plurality of bands.

Preferably, in the selective molecular excitation method according to the present invention, excitation light is provided for each vibrational quantum number of the molecules of the specific species and the excitation light of each vibrational quantum number is irradiated onto the gas.

Preferably, in the selective molecular excitation method according to the present invention, the interval of the central energies of adjacent ones of the plurality of bands is made equal to the difference of adjacent excitation energies of the molecules of the specific species.

Preferably, in the selective molecular excitation method according to the present invention, the excitation light is so arranged that there are sequentially output the first pulse train having a comb-shaped spectrum having a plurality of bands synchronized with the excitation energies of the plurality of rotational levels of the molecules of the specific species corresponding to every other one of the rotational quantum numbers and including four pulse lights of a same phase and the second pulse train having a comb-shaped spectrum having a plurality of bands synchronized with adjacent ones of the plurality of rotational levels corresponding to every other one of the rotational quantum numbers and including four pulse lights of sequentially inverted phases.

Preferably, in the selective molecular excitation method according to the present invention and defined above, a single pulse emitted from a light source is split by means of a half mirror and the split pulses are delayed by means of a plurality of interferometers and subsequently combined to produce a pulse train, the first pulse train and the second pulse train are produced by utilizing the inversion of phase taking place at the time for the pulse train to be reflected, and the excitation light is produced by delaying the second pulse train from the first pulse train and combining them.

Preferably, in the selective molecular excitation method according to the present invention, a chirp adjustment section made of an optical material having a dispersion characteristic is inserted into an optical path of the optical system for forming the excitation light to adjust the intervals of the plurality of bands of the comb-shaped spectrums.

In another aspect of the present invention, there is provided an isotope separation method for separating a specific isotope from a gas containing molecules of a plurality of species, each of the species including a plurality of isotopes, said method comprising: selectively exciting the molecules including the specific isotope by executing the selective molecular excitation method, targeting the molecules including the specific isotope as molecules of the specific species, and executing a process of ionizing or decomposing the molecules including the specific isotope in order to separate the specific isotope.

In still another aspect of the present invention, there is provided an isotope analysis method for analyzing the specific isotope content of a gas containing molecules of a plurality of species, each of the species including a plurality of isotopes, said method comprising: selectively exciting the molecules including the specific isotope by executing the selective molecular excitation method, targeting the molecules including the specific isotope as molecules of the specific species, and executing a process of ionizing or decomposing the molecules including the specific isotope in order to detect the specific isotope.

In still another aspect of the present invention, there is provided a selective molecular excitation apparatus for irradiating a gas with excitation light to selectively excite the molecules of a specific species in the gas, said apparatus comprising: an excitation light generation section that generates excitation light having a comb-shaped spectrum of a plurality of bands in an energy range so selected in advance as to include a plurality of excitation energies corresponding respectively to a plurality of rotational levels of the molecules of the specific species and the molecules other than the molecules of the specific species in the gas, the plurality of bands being so selected as to make all the excitation energies of the molecules of the specific species existing in the energy range to be included in the plurality of bands but some of the excitation energies of the molecules other than the specific species existing in the energy range to be not included in the plurality of bands; and an irradiation section that irradiates the excitation light into a sample cell containing the gas.

Preferably, in the selective molecular excitation apparatus according to the present invention, the excitation light generation section generates the excitation light for each vibrational quantum number of the molecules of the specific species and the irradiation section irradiates the excitation light of each vibrational quantum number into the sample cell.

Preferably, in the selective molecular excitation apparatus according to the present invention, the interval of the central energies of adjacent ones of the plurality of bands is made equal to the difference of adjacent excitation energies of the molecules of the specific species.

Preferably, in the selective molecular excitation apparatus according to the present invention, the excitation light is so arranged that there are sequentially output the first pulse train having a comb-shaped spectrum having a plurality of bands synchronized with the excitation energies of the plurality of rotational levels of the molecules of the specific species corresponding to every other one of the rotational quantum numbers and including four pulse lights of a same phase and the second pulse train having a comb-shaped spectrum having a plurality of bands synchronized with adjacent ones of the plurality of rotational levels corresponding to every other one of the rotational quantum numbers and including four pulse lights of sequentially inverted phases.

Preferably, in the selective molecular excitation apparatus according to the present invention, a chirp adjustment section made of an optical material having a dispersion characteristic is inserted into the excitation light generation section to adjust the intervals of the plurality of bands of the comb-shaped spectrums.

Preferably, in the selective molecular excitation apparatus according to the present invention, the irradiation section is so arranged that an optical path including the sample cell forms a resonator and an optical amplification medium is inserted in the optical path.

In a further aspect of the present invention, there is provided an isotope separation apparatus for separating a specific isotope from a gas containing molecules of a plurality of species, each of the species including a plurality of isotopes, the apparatus comprising: the selective molecular excitation apparatus, targeting the molecules including the specific isotope as molecules of the specific species.

Thus, according to the present invention as described above, molecules of a specific species can be selectively excited out of molecules of a plurality of species showing only a slight difference of mass.

DESCRIPTION OF THE PREFERRED EMBODIMENTS

Now, an embodiment of selective molecular excitation method according to the present invention will be described below. This selective molecular excitation method causes transitions among rotational levels to take place for the molecules of a specific species in a gas (sample) and excites the molecules by irradiating them with a laser beam having a comb-shaped spectrum. The general principle of the selective molecular excitation method, a method of raising the excitation efficiency of the selective molecular excitation method and an apparatus for executing the selective molecular excitation method will be described sequentially below.

(General Principle)

Figure 1:
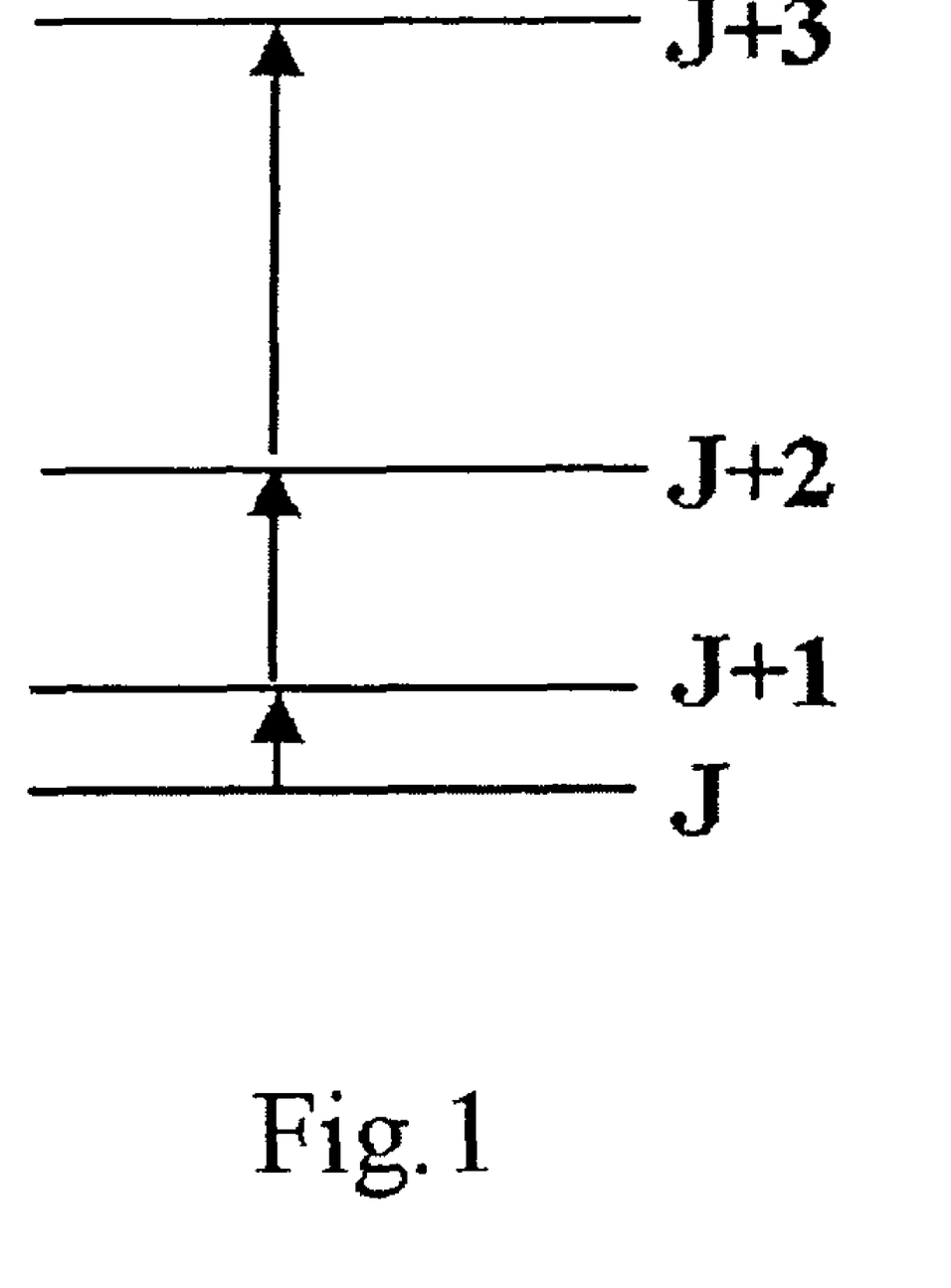
FIG. 1 is a schematic general illustration of rotational levels of molecules.

FIG. 1 is a schematic general illustration of rotational levels of molecules in gas. In FIG. 1, a high rotational level is shown at a high position. Each rotational level is defined by rotational quantum number J. For example, the energy E of a diatomic molecule is expressed as E=0 (J=0), 2B (J=1), 6B (J=2), 12B (J=3), . . . , using the rotational constant B of the molecule that is expressed by $B=(h/2\pi)^2/(2I)$, where h is the Planck constant and I is the moment of inertia of the molecule. Then, the transition energies (excitation energies) among the rotational levels are 2B (J=1→2), 4B (J=2→3), 6B (J=3→4), . . . accordingly, which are proportional to the J values before transition. The above statement also applies to any polyatomic molecules of other than diatomic molecules. Since transitions among rotational levels take place only when J changes within a rule of ΔJ=±1, the above listed excitation energies show one to one correspondence relative to the rotational levels. While the state of a molecule is defined not only by rotational quantum number J but also by vibrational quantum number v, the state shown in FIG. 1 holds true for each vibrational quantum number.

Figure 2:
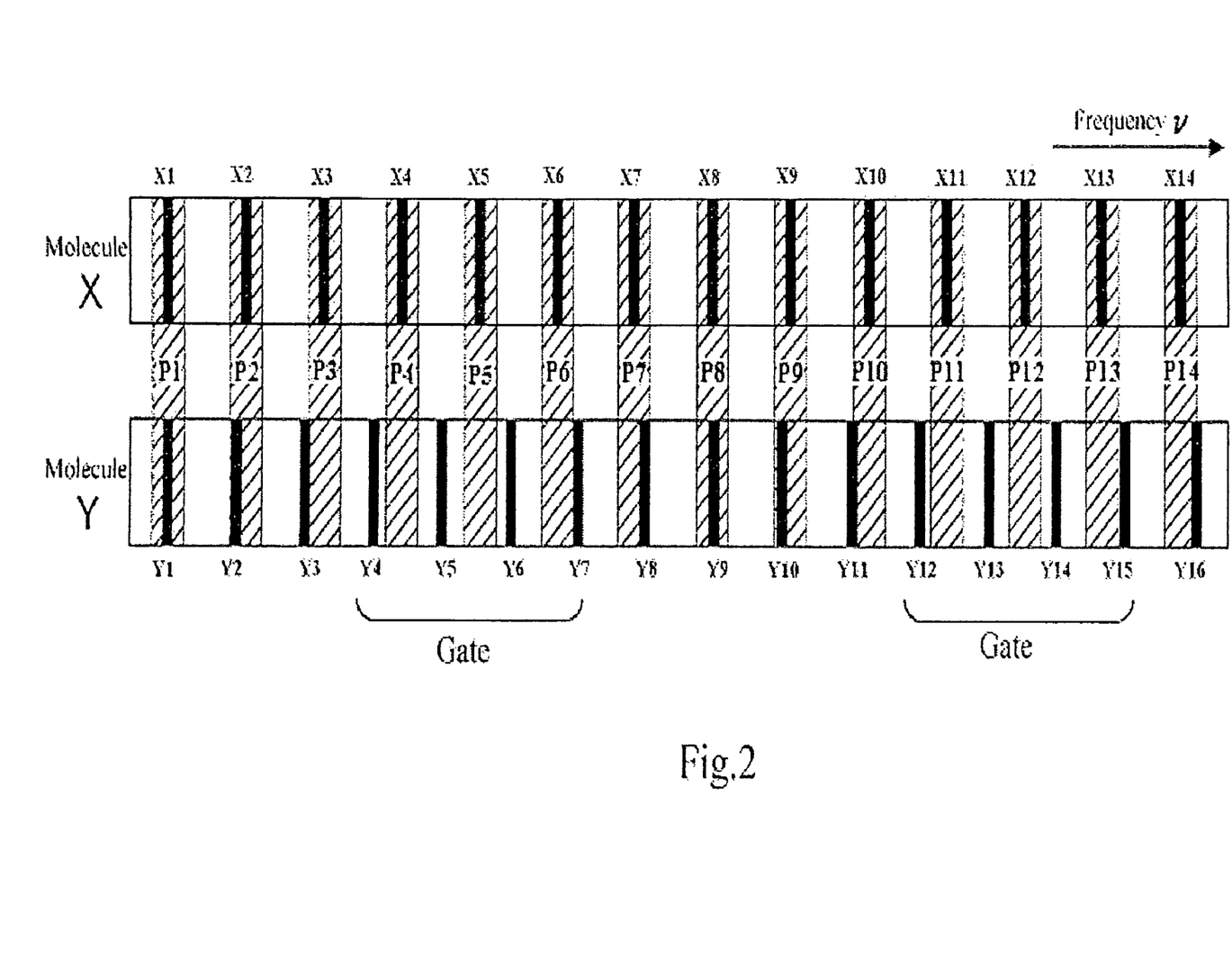
FIG. 2 is a schematic illustration of the principle of an embodiment of selective molecular excitation method according to the present invention.

Thus, energy levels (rotational levels) can be illustrated on a graph by using the horizontal axis for excitation energies. The upper diagram in FIG. 2 shows the energy levels X1 through X14 of molecule X in a simplified expression. The lower diagram in FIG. 2 shows energy levels Y1 through Y16 of molecule Y that is different from the molecule X. The energy levels of the atoms are indicated by black line segments and, while the horizontal axis indicates the oscillation frequency (transition frequency) v of electromagnetic wave that corresponds to the excitation energy, a similar result is obtained when the horizontal axis is made to indicate J or energy. Therefore, energy and oscillation frequency are regarded as equivalent for the purpose of convenience and hence the expression of "excitation energy" may be used in the sense of oscillation frequency of electromagnetic wave that corresponds to excitation energy from the viewpoint of convenience in the following description. The diagrams tell that the rotational levels X1 through X14 of molecule X and the rotational levels Y1 through Y16 of molecule Y are included in the shown oscillation frequency range (energy range). Note that adjacent levels are displayed at regular intervals and the interval (to be referred to as rotational comb hereinafter) is defined as 4πBc (where c is the velocity of light) in terms of oscillation frequency. In other words, the difference of excitation energy between adjacent rotational levels is constant and referred to as "rotational comb". A rotational comb can be expressed both in terms of energy and in terms of oscillation frequency. Since the value depends on the rotational constant B, the rotational comb differs between molecule X and molecule Y when the moment of inertia I of molecule X differs from that of molecule Y. For example, when the atoms of molecule X and the atoms of molecule Y are isotopes of a same element, the moment of inertia I and hence the rotational comb differ between molecule X and molecule Y because the mass of the isotopes of the former molecule differs slightly from that of the isotopes of the latter molecule. FIG. 2 shows the relationship of the rotational levels of molecule X and those of molecule Y when the molecules are formed by isotopes of an element that are different from each other. As described above, the relationship holds true for each vibrational quantum number v.

Since the energy levels of the molecules existing in an actual substance show a thermal distribution, the energies of molecules X and Y have a certain population at levels X1 through X14 and Y1 through Y16 within the zone shown in FIG. 2.

Now, assume an instance where an electromagnetic wave showing a comb-shaped spectrum having a plurality of narrow bands as indicated by P1 through P14 that respectively tune with the excitation energies that correspond to the rotational levels of molecule X is irradiated onto the molecule X. Note that the comb-shaped spectrum tunes with the excitation energies that correspond to the rotational levels means that the excitation energies that correspond to the plurality of consecutive rotational levels of molecule X overlap the bands of the comb-shaped spectrum and that the interval of the central energies (the central oscillation frequencies) of any two adjacent bands is constant and equal to the rotational comb. Then, the levels of X1 through X14 are included in the respective bands of P1 through P14 as shown in FIG. 2. Molecule X makes transition to a different energy level by absorbing one of the electromagnetic wave energies. Note, however, that, if the rotational quantum number is J, a transition from a rotational level to another only within the rule of ΔJ=±1 as described earlier. In other words, since the state of X2 can make transition only to the state of X1 or that of X3 and the electromagnetic wave band that is required for excitation to the state of X3 is P3, the electromagnetic wave is absorbed and a transition to X3 takes place. When excitation to the state of X3 is done, the state of X3 can make transition to the state of X2 or that of X4 and a transition to X4 takes place by the electromagnetic wave of the band P4. Similarly, a transition from X4 to X5 and so on can take place in a similar manner.

In short, while transition takes place only from a level to an adjacent level by a single absorption in the above-described condition, it is possible to cause molecule X to make transitions sequentially to higher energy levels by means of an electromagnetic wave having a comb-shaped spectrum that is tuned with the energy levels X1 through X14. In other words, transition from X1 to X14 can take place by repeating the above-described absorption process. Differently stated, it is possible to cause molecule X to make one or more than one transitions to a level higher than the current level by one or more than one levels, whichever appropriate, by means of an electromagnetic wave having a comb-shaped spectrum regardless of the level in the initial state. While FIG. 1 shows only few levels, it is possible to excite to maximum rotational quantum number $J_{max}=\Omega/(4\pi cB_x)$, where $\Omega$ is the highest frequency of the electromagnetic wave and $B_x$ is the rotational constant of molecule X.

On the other hand, the energy levels of molecule Y do not tune with the comb-shaped spectrum because the rotational comb of molecule Y differs from that of molecule X as shown in FIG. 2. Thus, while levels Y1 through Y3, Y8 through Y11 and Y16 overlap with P1 through P3, P7 through P10 and P14, the levels Y4 through Y7 and Y12 through Y15 do not have any overlapping electromagnetic wave band. When such an electromagnetic wave is irradiated onto molecule Y, transitions from Y1 to Y2 and from Y2 to Y3 can take place and hence it is possible to cause molecule Y to make transitions sequentially from Y1 to Y3. However, it is not possible for molecule Y to make transition from Y3 to Y4. Similarly, it is not possible for molecule Y to make transitions from Y4 to Y5, from Y5 to Y6 and from Y6 to Y7. In other words, it is not possible to excite molecule Y that is at the level of Y1 to the level of Y4 or a higher level. Similarly, while it is possible to cause molecule Y to make transitions sequentially from Y8 to Y11, it is not possible to excite molecule Y to the level of Y12 or a higher level. A range where no transition can take place is referred to as "gate" hereinafter. More specifically, in FIG. 2, there are two gates including one for the range from Y4 to Y7 and one for the range from Y12 to Y15. It is not possible for molecule Y to make transition from a rotational level to another rotational level, skipping one of the gates. Therefore, it is not possible for molecule Y to make transitions from Y1 to Y15. While FIG. 2 shows only part of all the levels, a gate appears periodically when the horizontal axis is made to indicate frequency v and the central frequencies are expressed by the formula shown below.

[Mathematical Formula 1]

$$g(k) = \frac{2\pi c(2k+1)B_X^2}{|B_X - B_y|} \quad (k = 0, 1, 2, \ldots) \quad (1)$$

Thus, the relation as expressed below holds true, where $\omega(J)$ is the transition frequency at rotational quantum number J and X(J) is molecule X having a rotational quantum number of J and so on. In other words, while state (J) of molecule X and that of molecule Y are thermally distributed in an actual substance, the molecule X is excited to a state of $J_{max}$ when the substance is irradiated with an electromagnetic wave showing a comb-shaped spectrum as described above. On the other hand, the molecule Y cannot make transition form a state having a transition frequency lower than a gate frequency g(k) to a state having a transition frequency higher than the gate frequency.

[Mathematical Formula 2]

$$X(J)|_{\omega(J)<\Omega} \rightarrow X(J_{max}) \quad (2)$$

[Mathematical Formula 3]

$$Y(J)|_{\omega(J)<g(k)} \xrightarrow{\times} Y(J)|_{\omega(J)>g(k)} \quad (3)$$

If the difference between molecule X and molecule Y lies only in the difference of isotopes constituting the molecules, they show different rotational constants (rotational combs) that correspond to the slight difference of mass. Thus, while molecule X can be excited to $J_{max}$ by using an electromagnetic wave showing a comb-shaped spectrum that matches the rotational comb of the molecule, one or more than one gates appear to molecule Y to make it impossible to excite molecule Y to $J_{max}$. Obviously, conditions for making one or more than one gates appear to molecule Y can be determined by appropriately selecting a lowest frequency and a highest frequency for the comb-shaped spectrum and making the difference between the frequencies sufficiently large.

Therefore, it is possible to selectively excite molecule X on the basis of the above-described principle. Note that molecules X are distributed among the levels X1 through X14 with the population density that is defined by the thermal distribution in an actual substance before irradiation of an electromagnetic wave (in the initial state). Molecule X can be excited by means of an electromagnetic wave showing a comb-shaped spectrum as illustrated in FIG. 2 regardless to which one of the levels X1 through X14 the state of a certain molecule X corresponds. In other words, molecule X can be selectively excited by using an electromagnetic wave showing a comb-shaped spectrum as described above regardless of the initial state of the molecule. More specifically, a specific molecule can be selectively excited among molecules of different species that show only a slight difference of mass because it is possible to define a comb-shaped spectrum that can give rise to one or more than one gates if the molecules of different species have different respective masses.

Additionally, as described above, an electromagnetic wave showing a comb-shaped spectrum is preferably provided for each vibrational quantum number v. Then, all the molecules X in a state of vibrational quantum number v can be selectively excited by irradiating those electromagnetic waves simultaneously or sequentially.

Once the molecules of a specific species in a sample are selectively excited, ionized atoms can be obtained only from the excited molecules. For example, ionized atoms can electrically easily be separated by introducing a treated sample gas between electrodes to which a voltage is applied. Therefore, isotopes can be separated by means of the selective excitation method. If separated isotopes are detected, they prove that the sample contains them. Thus, the isotopes contained in a sample can be analyzed by means of the selective excitation method. Similarly, only excited molecules can be decomposed by means of a method of irradiating an electromagnetic wave to further excite the excited molecules for higher rotational levels until the molecules are decomposed. The decomposition product can be separated with ease by selectively adsorbing the decomposition product that has turned into a different chemical species or causing it to coagulate.

Figure 3:
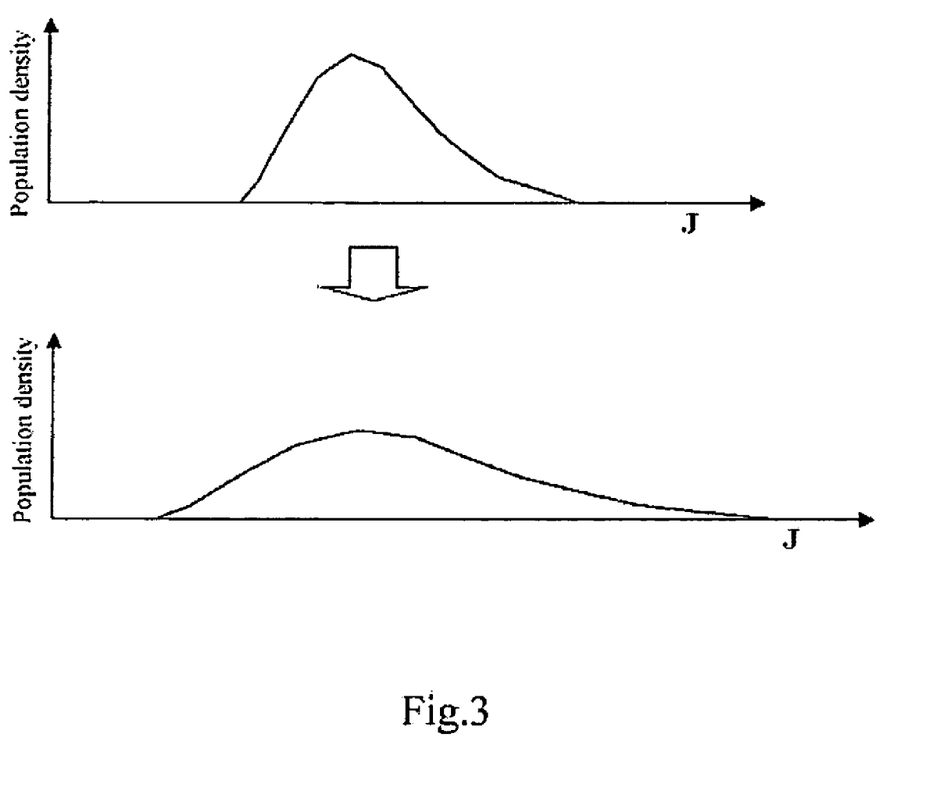
FIG. 3 is a schematic illustration of a change in the population distribution of molecules that takes place after irradiation of excitation light.

Note that transitions among rotational levels take place only to a state of $\Delta J=+1$ but also to a state of $\Delta J=-1$. Thus, transitions in an actual substance take place randomly and hence transitions to lower energy levels occur like a "random walk". For example, when an electromagnetic wave having a comb-shaped spectrum as described above is irradiated onto a molecule X showing an population distribution relative to J as shown in FIG. 3a, the distribution spreads not only in the growing direction of J (in the direction toward higher energy levels) but also in the reducing direction of J (in the direction toward lower energy levels) as shown in FIG. 3b. If such is the case, the spectrum does not spread beyond the range of J that corresponds to a gate relative to molecule Y as pointed out above. Thus, molecules X can obviously be selectively excited if the difference of moment of inertia (the difference of mass) is small between molecule X and molecule Y. In other words, a specific molecule can be selectively excited among molecules of a plurality of species that shown only a slight difference of mass. Therefore, when there are molecules of a plurality of species including isotopes, it is possible to selectively excite a molecule having a specific isotope.

If J that corresponds to X1 in FIG. 2 is expressed as min in the above-described example, a plurality of bands (P1 through P14) of the comb-shaped spectrum are made to respectively tune with excitation energies (indicated by X1 through X14) that correspond to the rotational levels of molecule X within the energy range defined by $J_{min} \sim J_{max}$. In other words, all the excitation energies of molecule X existing in the energy range are included in the plurality of bands. However, some of the excitation energies that corresponds to the rotational levels of some other molecule (molecule Y) existing in the energy range may not be included in the plurality of bands (gates: Y4 through Y7, Y12 through Y16). This arrangement can be realized by making the intervals of the plurality of bands equal to the rotational comb of molecule X. In other words, $J_{min}$ and $J_{max}$ can be appropriately selected depending on the species (the rotational levels) of molecule X and molecule Y.

The requirement that the interval of the central energies (the central oscillation frequencies) of any two adjacent bands needs to be constant (the interval being referred to as rotational comb) should be strictly satisfied when the width of each of the bands in the comb-shaped spectrum is so narrow that it is negligible as clearly be seen from FIG. 2. However, the bands have a significant width in reality and hence the interval needs not necessarily be strictly constant. If the interval is not strictly constant, it can be regarded as substantially constant and equal to the rotational comb so long as no gate is produced relative to molecule X but one or more than one gate are produced to other molecules and hence the above-described effect can be achieved. Additionally, as will be described hereinafter, the difference between the excitation energies of two adjacent rotational levels can slightly deviate from the constant value (=rotational comb) under the influence of molecular distortions and then the interval of the central energies of two adjacent bands may be finely adjusted for the comb-shaped spectrum. The interval can be regarded as substantially constant in such an instance.

Furthermore, the plurality of bands of the comb-shaped spectrum is made to show one to one correspondence relative to the rotational levels of molecule X in the diagram of FIG. 2. In other words, it is not necessary to make the interval of the central energies (the central oscillation frequencies) of two adjacent bands constant. For example, a similar effect can obviously be achieved when the bands (P1 through P3, P7 through P10) that are not included in any gate are replaced respectively by wide pulses formed by linking them, although the intervals are then made to be not constant. Differently stated, a plurality of bands that are different from the above-described ones can be defined appropriately for a comb-shaped spectrum. If such is the case, the energy range to be handled ($J_{min} \sim J_{max}$) is so selected in advance as to include a plurality of excitation energies that correspond to the plurality of rotational levels of molecules of a specific species (molecule X to be excited) and also a plurality of excitation energies that correspond to the plurality of rotational levels of one or more than one species other than the specific species (molecule Y not to be excited). More specifically, it may be so arranged that all the excitation energies of molecule X existing in the energy range are included respectively in the plurality of bands, whereas some of the excitation energies of molecule Y existing in the energy range are not included in the plurality of bands. Note, however, that it is particularly easy to make the interval of the central energies (the central oscillation frequencies) of two adjacent bands constant as will be described hereinafter. Then, the interval is equal to the rotational comb of molecule X (molecules of the specific species to be excited). Note also that the intensities of light of the bands needs not necessarily be equal.

(Technique of Further Raising Excitation Efficiency)

Now, a technique of further raising the excitation efficiency of the above-described selective excitation method by appropriately selecting an electromagnetic wave (excitation light) having a comb-shaped spectrum. This technique is particularly effective in general cases where molecule X in a sample shows a distribution at each rotational level.

Figure 4A:
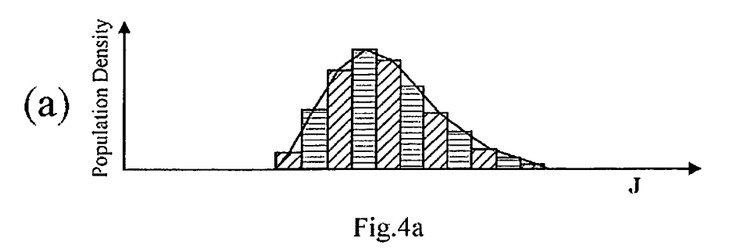
FIG. 4a is a graph of population distribution of molecule X.
Figure 4B:
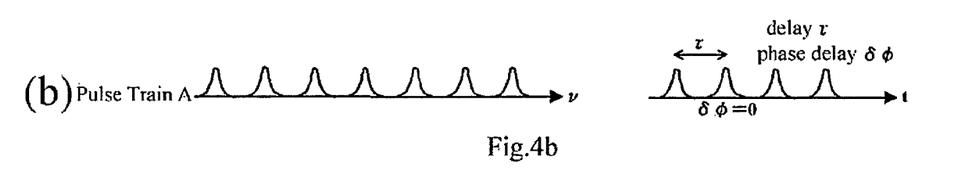
FIG. 4b is a schematic illustration of the corresponding formation of the first pulse train.
Figure 4C:
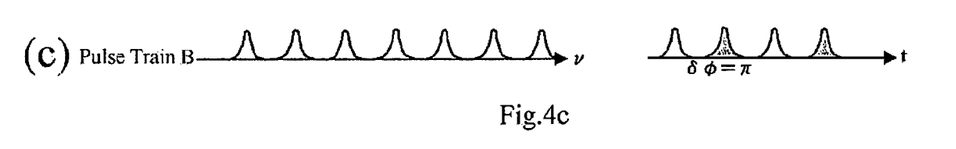
FIG. 4c is a schematic illustration of the corresponding formation of the second pulse train.

For this technique, an electromagnetic wave having the configuration that is described below may be employed as an example. In this example, the electromagnetic wave to be used for excitation is formed by combining pulse train A (the first pulse train) and pulse train B (the second pulse train). FIG. 4a is a graph schematically illustrating the population density distribution of molecule X (horizontal axis: J) before irradiation of an electromagnetic wave. For the convenience of the description that follows, J is divided for sections of two different types (sections shaded by horizontal line segments and sections shaded by oblique line segments). FIG. 4b shows at the left side the corresponding comb-shaped spectrum (horizontal axis: oscillation frequency) of pulse train A and at the right side the oscillation waveform of pulse train A (horizontal axis: time). FIG. 4c shows at the left side the corresponding comb-shaped spectrum (horizontal axis; oscillation frequency) of pulse train B and at the right side the oscillation waveform of pulse train B (horizontal axis: time).

While both pulse train A and pulse train B have a comb-shaped spectrum, the interval of two comb-shaped bands is twice as large as the rotational comb and hence each band corresponds to every other J unlike the instance of FIG. 2. In other words, pulse A has bands that correspond to J at positions indicated by sections shaded by horizontal line segments, while pulse B has bands that correspond to J at positions indicated by sections shaded by oblique line segments. In other words, the sections shaded by horizontal line segments correspond to odd-numbered J, while the sections shaded by oblique line segments correspond to even-numbered J or vice versa.

Additionally, as shown at the right side of FIGS. 4b and 4c, both pulse trains A and B are fourfold pulses with oscillation intervals of τ. Note, however, that the four outputs of pulse train A are in phase with each other, whereas the phases of the four outputs of pulse train B are sequentially inverted. The spectrums of pulse trains A and B can be expressed by the mathematical formulas shown below, where Io(ω) is the spectrum of the original signal light from which the pulses are produced. The pulses show a delay time of τ and a phase delay of δø.

[Mathematical Formula 4]

$$I_4(\omega) = I_0(\omega)(\cos\theta+1)(\cos(2\theta)+1) \quad (4)$$

[Mathematical Formula 5]

$$\theta = \omega\tau - \delta\emptyset \quad (5)$$

If the rotational constant of the molecule to be excited is B and τ=1/(4Bc) while δø=0, the peaks of the spectrum are expressed by ω=4(2k)πBc (where k=0, 1, 2 . . . ). Thus, if δø=π, ω=4(2k+1)πBc. The rotational comb (oscillation frequency) thereof is 4πBc and hence pulse train A and pulse train B can be brought into state of δø=0 and that of δø=π respectively. In short, pulse train A and pulse train B in the pulse expressed by formulas (4) and (5) differs from each other only in terms of phase δø.

The irradiation of pulse train B is made to delay by τ' from the irradiation of pulse train A. Therefore, in reality, the pulse train shown at the right side of FIG. 4c is an 8-fold pulse that comes after τ' from the pulse train shown at the right side of FIG. 4b. Pulse train A is defined so as to become n pulse that excites the state of the area indicated by the sections shaded by horizontal line segments to state (ΔJ=+1) higher by one, whereas pulse train B is defined so as to become π pulse that excites the excited state further to state (ΔJ=+2) further higher by one. In other words, their phases and their pulse energies are so defined as to selectively cause such excitations. Pulse train A and pulse train B have different spectrums (bands) and each of them has a comb-shaped spectrum having bands that correspond to every other J. Thus, two adjacent bands of each of pulse train A and pulse train B are not excitation energies of consecutive rotational levels of the molecule to be excited unlike the comb-shaped spectrum illustrated in FIG. 2. However, as both pulse train A and pulse train B are irradiated at bands consecutively to form 8-fold pulses, they cover all the excitation energies that correspond to all the J values from $J_{min}$ to $J_{max}$. Therefore, the entire spectrums of 8-fold pulses tune with the excitation energies that correspond to the rotational levels of molecule X as in the case of FIG. 2.

Figure 4D:
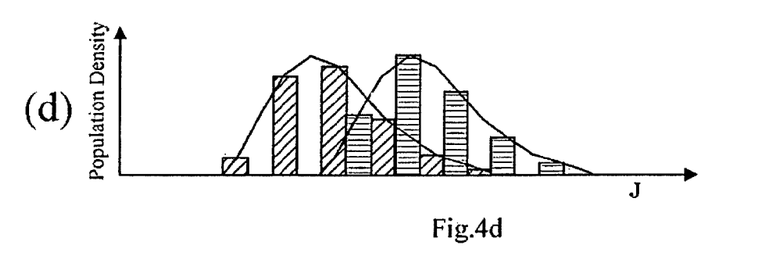
FIG. 4d is a state distribution after an irradiation of an 8-fold pulse.

FIG. 4d shows the state distribution after an 8-fold pulse is irradiated once on molecule X that shows an population density distribution as shown in FIG. 4a (the single irradiation of an 8-fold pulse is referred to as "π pulse burst" hereinafter). As a result, all the region of the sections shaded by horizontal line segments makes transition to a region higher by two in terms of J. In other words, they shifts rightward by two J values (to the side of larger J values and hence to the side of higher energy levels).

On the other hand, the state of the region of the sections shaded by oblique line segments differs and does not tune with the above-described two n pulses. The phase of the Rabi oscillation between the level of this region and the level that is higher by one is reverse relative to the phase of the region of the sections shaded by horizontal lines. Therefore, the region of the sections shaded by oblique lines cannot shift rightward by this irradiation and inversely shifts leftward (to the side of smaller J values and hence to the side of lower energy levels).

Figure 5A:
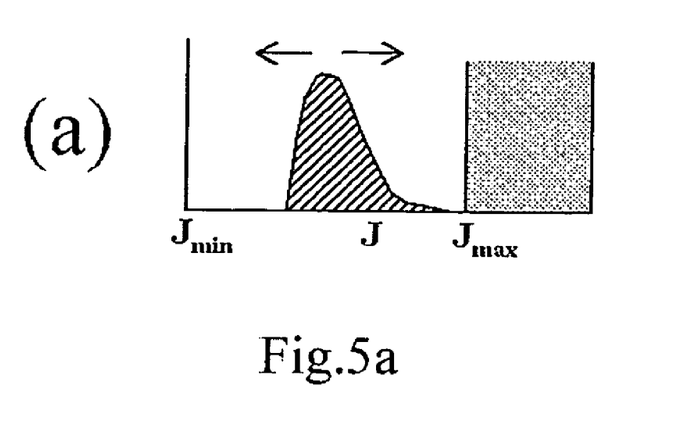
FIGS. 5a through 5c are schematic illustrations of a change in the population distribution that can be observed as a result of irradiation of a n pulse burst.
Figure 5B:
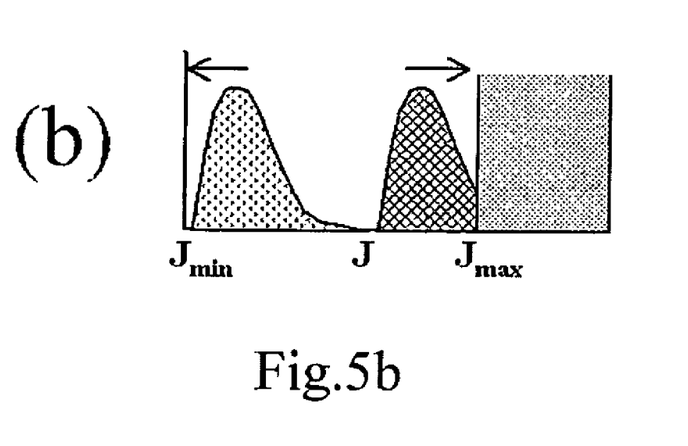
Figure 5C:
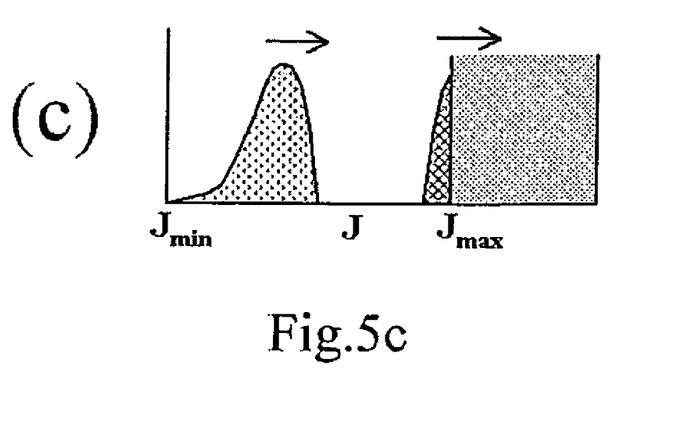

Thus, each time of irradiation of such a n pulse burst, the region, or the group, of the sections shaded by horizontal lines shift rightward by two J values, whereas the region, or the group, of the sections shaded by oblique lines shift leftward by two J values. FIG. 5a through 5c schematically illustrate this state. Then, the distribution is split into two groups, left one and right one, which shift leftward and rightward respectively. Which group shifts which way depends on if the initial value of J is an odd number or an even number.

When the group that shifts rightward gets to $J_{max}$, the molecules of the group can be ionized or decomposed by means of a laser beam that is provided separately. In other words, the molecules of the group are excited uniformly to $J_{max}$, and never return. On the other hand, the levels of the molecules of the group that shifts leftward to get to $J_{min}$, which is the lowest J of the rotational levels having a transition frequency in the oscillation bands of pulse trains A and B as shown in FIG. 5c. However, they cannot go down beyond $J_{min}$ and hence are reflected when they gets to $J_{min}$. Then, the group shifts rightward when irradiated with a pulse train. Then, it ultimately gets to $J_{max}$ like the group that shifts rightward initially. Thus, the molecules of this group are uniformly excited and gets to $J_{max}$ like the molecules of the group that shifts rightward initially.

When such an 8-fold pulse is irradiated for $N_J (=J_{max}-J_{min}+1)$ times onto the object substance, the time span during which the pulse continues (the burst continuation time) Δ is 8τN$_J$ if τ'=4τ. The molecules that are distributed between $J_{min}$ and $J_{max}$ in the initial state are excited once to the state of J during the time span. Then, the atoms of the molecules that are excited to $J_{max}$ can be separated typically by irradiating an ionizing laser beam thereafter within a certain time that is not longer than τ.

Thus, molecules can selectively and particularly highly efficiently be excited by means of an 8-fold pulse, or a π pulse burst, provided in a manner as described above. For the π pulse burst, excitation light having a comb-shaped spectrum as shown in FIG. 2 is irradiated not once but 4-fold pulses of two different types, each of which corresponds to a plurality of bands selected by picking up every other band of the comb-shaped spectrum are irradiated at intervals. A highly efficient excitation can be realized by such an arrangement.

Note that, while both pulse train A and pulse train B are 4-fold pulses formed by four pulses in the above-described example, it is clear that selective excitation can be realized in a similar manner by using 8-fold pulses, 16-fold pulses or the like. The number of pulses can be appropriately selected according to the processing speed, the yield and so on required for the process. The above-described effect can be achieved by means of an arrangement of using four or more than four pulses for a pulse burst.

While a simplified arrangement is described above, the excitation probability can be determined by an analysis of multistage rotational transition using Schrödinger equation in actuality. For example, in an instance where molecule X is a diatomic molecule having a closed shell electronic configuration, the excitation probability ρx of molecule X to $J_{max}$ is 0.97, which is a satisfactory value, when $J_{min}$=0 and $J_{max}$=400.

Figure 6A:
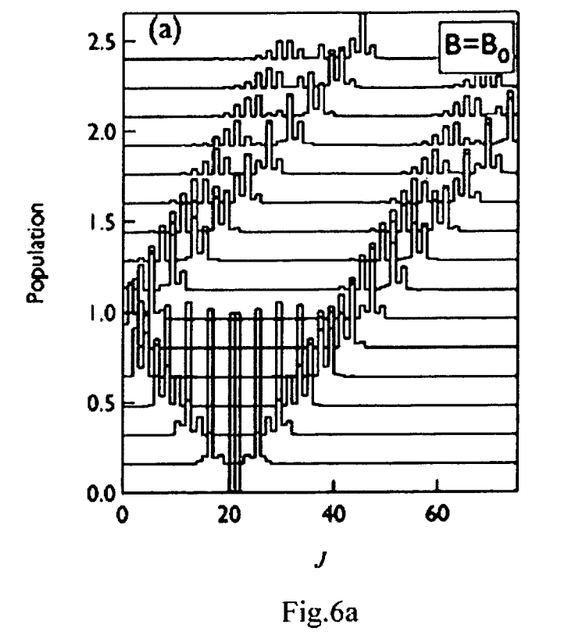
FIGS. 6a and 6b are schematic illustrations of the results of simulations of the change in the probability density caused by irradiation of a n pulse burst for (A) molecule X having a rotation constant of Bo and (B) molecule Y having a rotational constant of 0.98 Bo.
Figure 6B:
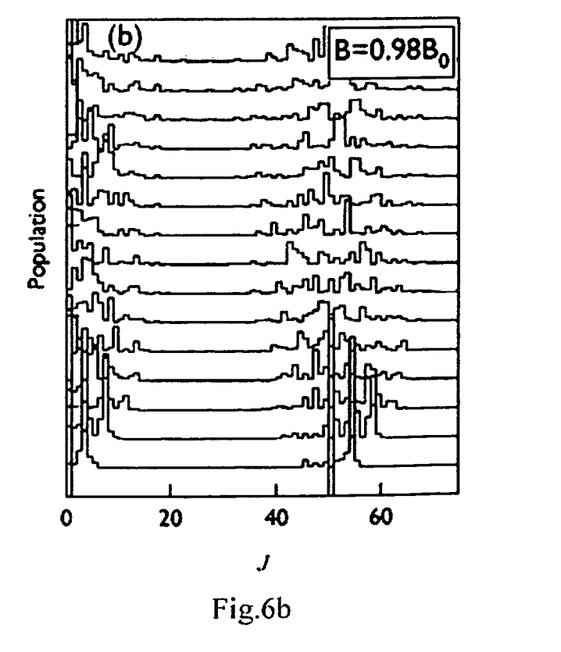

FIG. 6 shows the results of a quantum mechanical simulation conducted by applying the technique of irradiating an 8-fold pulse. FIG. 6a shows an instance where molecule X has a distribution at J=20 and 21 as initial condition when the rotational constant=Bo, whereas FIG. 6b shows an instance where molecule Y has a distribution at J=0 and 50 as initial condition when the rotational constant=0.98×Bo. Each of the graphs shows the population density distributions observed after an irradiation of a π pulse burst, a π pulse burst being irradiated four times, the vertical axis being shifted from below to above to show the distributions simultaneously. The π pulse burst is made to match the instance where the rotational constant=Bo.

From the results shown in FIG. 6a, it is confirmed that the state where J=21 initially shifts rightward (to the side of larger J values) after each irradiation. On the other hand, it is confirmed that the state where J=20 initially shifts leftward (to the side of smaller J values) first and then reflected to shift rightward. Thus, the state illustrated in FIG. 5 is confirmed by the quantum mechanical simulation. In other words, molecules in either one of the states ultimately make transition to a state where J is greater as a result of repeated irradiation of a n pulse burst.

On the other hand, such a phenomenon is not observed when the rotational constant does not mach the n pulse burst (FIG. 6b). More specifically, while the state where J=0 or 50 makes transition to its vicinity but never makes transition to the vicinity of J=20 to 30. This phenomenon corresponds to the fact that there is a gate in that range. Thus, molecules in a state where J=0 or 50 never makes transition to a state where J is greater as a result of repeated irradiation of a π pulse burst.

Thus, that a specific molecule can selectively and highly efficiently be excited by irradiating a n pulse burst that is made to match the specific molecule is confirmed by a quantum mechanical simulation.

(Configuration of Apparatus)

Now, an arrangement for preparing an 8-fold pulse and actually irradiating a π pulse burst will be described below. Assume here that the gas of the object substance (sample) contains is constituted by molecule X and molecule Y, which are isotopes of a same element that are different from each other and molecule X is to be selectively excited. Firstly, J is determined. If the yield of molecule X (the ratio of the molecules X that are excited to $J_{max}$ or above relative to all the molecules X that are the object of attention) is $\varnothing_X$ and the target separation factor is α, the yield $\varnothing_Y$ of molecule Y is expressed by the formula shown below.

[Mathematical Formula 6]

$$\varnothing_Y = \varnothing_X/\{(1-\varnothing_X)\alpha\} \tag{6}$$

On the other hand, it can safely be assumed from the above-described principle that the quantity of molecule Y that is excited to $J_{max}$ or above is negligible if compared with the quantity thereof that is distributed at and above $J_{max}$ in the initial state and hence the quantity can be defined in terms of thermal distribution. Then, $\varnothing_Y$ is expressed by the formula shown below.

[Mathematical Formula 7]

$$\phi_Y = \sum_v \sum_{J>J_{max}} f(v, J) \tag{7}$$

In the above formula, f(v, J) is the normalized Boltzmann distribution (expressed in terms of vibrational quantum number v and rotational quantum number J). Thus, when the separation factor α is defined, $J_{max}$ can be defined from the formulas (6) and (7).

Then, $J_{min}$ is defined in a similar manner. For this purpose, the initial distribution ratio Fx in the electromagnetic wave bands to be handled is defined by the formula shown below.

[Mathematical Formula 8]

$$F_X = \varnothing_X/\rho_X \tag{8}$$

Since this ratio can be assumed to be defined in terms of thermal distribution, Fx is expressed by the formula shown below when the upper limit of vibrational quantum number v is $v_{max}$.

[Mathematical Formula 9]

$$F_X = \sum_{v<v_{max}} \sum_{J=J_{min}}^{J_{max}} f(v, J) \tag{9}$$

Thus, if $J_{max}$ is determined, $J_{min}$ is determined by using the formulas (8) and (9). From the above, both $J_{max}$ and $J_{min}$ are determined, so that the number $N_J$ of the rotational levels in the band is $J_{max}-J_{min}+1$, which is the number of times for which a π pulse burst needs to be repeated.

The energy E in pulse train A and pulse train B are so selected to make the pulses a n pulse that is effective for causing a transition to a state of ΔJ=+1 to take place. The energy is determined by the formula shown below on the basis of the relationship between the oscillation frequency of Rabi oscillation and the electric field intensity of n pulse.

[Mathematical Formula 10]

$$E=\pi^2 h^2 cnBN_J s/(Z_0 \mu_{J0}^2) \tag{10}$$

In the above formula, n is the refractive index (which is 1 in vacuum), Zo is the impedance of vacuum, s is the area of irradiation of excitation pulse, $\mu_{J0}$ is the transition dipole moment for transitions J→J+1, $M_J$→$M_J$ respectively from rotational quantum number J and magnetic quantum number $M_J$ (=0).

It is necessary for excitation pulse light to be focused into and absorbed by the gas of the sample. For the absorption reaction to take place highly efficiently, the length of the reaction section of the apparatus is preferably made equal to the Rayleigh length L at the focus of excitation pulse light. Then, the lowest oscillation frequency (for the longest wavelength) that corresponds to $J_{min}$ is selected for the oscillation frequency for defining the Rayleigh length. The Rayleigh length is given by the formula shown below, where the $M^2$ value that is the index for expressing the beam quality is expressed as $M^2$.

[Mathematical Formula 11]

$$L=4B(J_{min}+1)s/M^2 \tag{11}$$

The rate r at which the n pulse burst is repeated is given by the formula shown below, where $\chi_x$ is the initial isotope ratio (the ratio of molecule X existing in the sample), p is the sample vapor pressure, T is the temperature at the vapor pressure and k is the Boltzmann constant from the relationship between the required processing speed Q and the processing quantity of a single π pulse burst.

[Mathematical Formula 12]

$$r=QkT/(Lsp\varnothing_X\chi_x) \tag{12}$$

On the other hand, the required sample flow rate $Q_v$ is given by the formula shown below.

[Mathematical Formula 13]

$$Q_v=Lsr \tag{13}$$

While excitation light is a laser beam in the above description, it may not necessarily be light (visible light) so long as it is a coherent electromagnetic wave that corresponds to the excitation energy of the target molecule. In other words, excitation light in the above description may not necessarily be light and may alternatively be a coherent electromagnetic wave having energy that corresponds to the excitation energy between rotational levels of the molecule to be excited.

Figure 7:
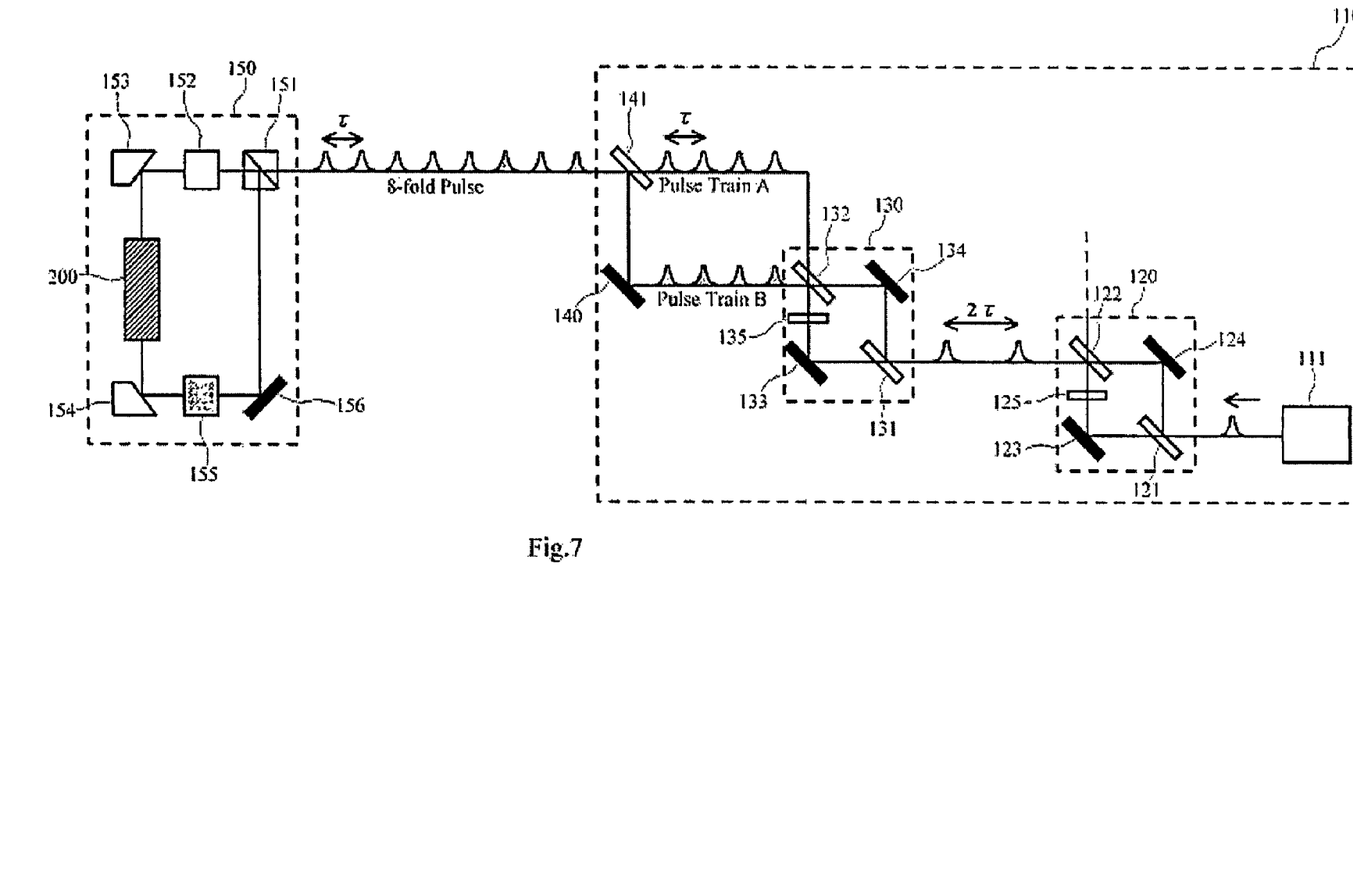
FIG. 7 is a schematic illustration of the constitution of an embodiment of selective molecular excitation apparatus according to the present invention.

Now, the configuration of the apparatus for generating an 8-fold pulse and irradiating it onto a sample will be described below. FIG. 7 is a schematic illustration of such a selective excitation apparatus 100. The selective excitation apparatus 100 comprises an excitation light generation section 110 and an irradiation section 150 and a gaseous sample is introduced into a sample cell having a length of L and a cross sectional area of s in the irradiation section 150.

Firstly, the configuration of the excitation light generation section 110 for generating an 8-fold pulse. It generates a pulse train by branching a single pulse by means of a half mirror, delaying the split pulses by means of a plurality of interferometers and combining them. Pulse train A (the first pulse train: δø=0) and pulse train B (the second pulse train: δø=π) are produced simultaneously by utilizing the inversion of phase that takes place when the pulse train is reflected. Subsequently, an 8-fold pulse is produced by delaying pulse train B relative to pulse train A and combining them.

The single pulse is a pulse having a broadband spectrum that covers transition frequencies between ω(Jmin) and ω(Jmax) and emitted from a pulse light source 111. The pulse enters the first interferometer 120. Half mirrors 121, 122 and reflector mirrors 123, 124 are arranged on the optical path of the first interferometer 120 and the optical path is branched into two paths so that two pulses are produced with a predefined delay time by providing a difference between the optical paths. A delay time of 2τ is predefined as shown in FIG. 4.

The pulse then enters the second interferometer 130. Half mirrors 131, 132 and reflector mirrors 133, 134 are arranged similarly on the optical path of the second interferometer 120 and the optical path is branched into two paths. As for reflections at the half mirrors 131, 132, the phase of the reflected wave is shifted by π between when the reflection surface operates as free end (to reflect at the surface light entering from the side of the optical material to the side of the atmosphere) and when the reflection surface operates as fixed end (to reflect at the surface light entering from the side of the atmosphere to the side of the optical material). Therefore, if the reflection surface of the half mirror 131 is made to operate as fixed end and the half mirror 132 is made to operate as free end, two outputs including δø=0 (pulse train A) and δø=π (pulse train B), δø being defined in the formulas (4) and (5), will be obtained. Thus, pulse train A and pulse train B are produced from a single pulse by means of two interferometers including the first interferometer 120 and the second interferometer 130 in a manner as described above.

After being reflected by reflector mirror 140, pulse train B is combined with pulse train A by means of half mirror 141. At this time, the difference of their optical paths are so adjusted that pulse train B is output after pulse train A with a delay time of τ'. In this way, an 8-fold pulse (π pulse burst) is obtained. The pulse energy thereof is so selected as to be equal to E, which is described earlier.

The n pulse burst is irradiated onto the sample in sample cell 200. However, with the value of L that is actually employed, the energy of electromagnetic wave that is absorbed is very small. Thus, the irradiation section 150 is made to have a resonator (cavity) structure to raise the absorption efficiency. In the irradiation section 150, the direction of polarization of excitation pulse light sustainable in the cavity is determined by polarizer 151 and switching the direction of polarization by 90 degree is controlled by Pockels cell 152. Thereafter, excitation pulse light is made to enter the sample cell 200 by way of entrance optical system 153. Subsequently, after being transmitted through the sample cell 200, excitation pulse light is transmitted through optical amplification medium 155 by way of exit optical system 154 before entering the polarizer 151 once again by way of reflection mirror 156. With this arrangement, a resonator structure is formed to include the sample cell 200 at the downstream side of the polarizer 151 and the optical amplification medium 155 is employed to compensate the loss. The efficiency of utilization of excitation pulse light can be raised in this way.

This arrangement provides two types of output for excitation pulse light including front end output $P_F$ of the pulse light source 111 and output $P_C$ of the optical amplification medium 155 (in the cavity). They are defined by the formulas shown below respectively. In the latter formula, $\xi$ is the loss per round in the cavity (due to reflection etc.).

[Mathematical Formula 14]

$$P_F = Erv_{max} \tag{14}$$

[Mathematical Formula 15]

$$P_C = 2N_I Er\xi \tag{15}$$

While the intervals of the rotational levels shown in FIG. 2 are ideally regular intervals, they may become irregular in reality. For example, the intervals decrease as J increases under the influence of molecular distortions due to centrifugal force. Chirp adjustment sections 125, 135 are provided respectively in the first interferometer 120 and the second interferometer 130 as precautionary measures. The chirp adjustment sections 125, 135 are formed by using an optical material having a dispersion characteristic relative to refractive index and can finely adjust the band intervals in an 8-fold pulse by differentiating the passing time of light as a function of wavelength (oscillation frequency). Thus, the spectrum of an 8-fold pulse can be made to match the intervals of the rotational level by means of them.

The results shown in FIG. 6 are obtained by computations on an assumption that a π pulse burst is absorbed ideally. In reality, for such an ideal absorption to take place, the time of continuation of a single π pulse burst is preferably shorter than the mean free time of molecules in gas (the average time until a collision). Additionally, the attenuation (the degree of light absorption) of the excitation pulse light is preferably negligible relative to 1 after being transmitted through the sample cell 200 once. Furthermore, the average moving distance of molecules during the time of continuation a π pulse burst if preferably smaller than the size of an illumination spot (e.g., s). Finally, the length of the reaction section (the length of the sample cell 200) and the flow rate (or the exhaust rate) are within a range that can be realized with ease in an apparatus (for example, not longer than 100 m for the former and not more than 10,000 L/s for the latter).

Parameters are defined for an instance where $^{135}$Cs in CsI is selectively excited and separated by means of an arrangement as shown in FIG. 7. Table 1 shows the parameters of CsI that are employed and the defined parameters for the separation (selective excitation). Table 2 shows the parameters of the selective excitation apparatus. More specifically, Table 2 shows design values of four cases from Case 1 to Case 4.

TABLE 1

| constant | | defined value |
|---|---|---|
| rotational constant | B (cm$^{-1}$) | 0.023 |
| fundamental oscillation frequency | $v_o$ (cm$^{-1}$) | 119.2 |
| permanent dipole moment | μ (Debye) | 12.1 |
| average nucleus interval | $r_c$ (nm) | 0.331519 |
| beam quality | $M^2$ | 1 |
| isotope existence ratio | Xx | 0.5 |
| required processing speed | Q (kg/y) | 10 |
| intra-band excitation efficiency | ηx | 0.97 |
| separation factor | α | 1000 |
| intra-resonator loss | $\xi$ | 0.05 |

TABLE 2

| | | Case 1 | Case 2 | Case 3 | Case 4 |
|---|---|---|---|---|---|
| | Control variable etc. | | | | |
| Target yield | $\varnothing_X$ | 0.5 | 0.5 | 0.5 | 0.9 |
| Irradiation area | s (mm$^2$) | 1000 | 10 | 1000 | 1000 |
| Vapor pressure | p (Torr) | 0.1 | 0.1 | 0.001 | 0.1 |

TABLE 2-continued

|  |  | Case 1 | Case 2 | Case 3 | Case 4 |
|---|---|---|---|---|---|
| Vibrational quantum number upper limit | $v_{max}$ | 10 | 10 | 10 | 20 |
| Apparatus specifications | | | | | |
| Temperature | T (K) | 924 | 924 | 762 | 924 |
| Maximum oscillation frequency | $v_{max}$(THz) | 0.607 | 0.607 | 0.552 | 0.502 |
| Minimum oscillation frequency | $v_{min}$(THz) | 0.168 | 0.168 | 0.161 | 0.062 |
| Number of intra-band rotational levels | $N_J$ | 319 | 319 | 284 | 320 |
| Pulse energy | E (mJ) | 6.22 | 0.06 | 5.54 | 6.24 |
| Length of reaction section (Rayleigh length) | L (m) | 1.122 | 0.011 | 1.076 | 0.414 |
| Burst repetition frequency | r (Hz) | 4.9 | 49080 | 421.9 | 7.4 |
| Flow rate | $Q_v$ (L/s) | 6 | 6 | 454 | 3 |
| Average output (front end) | $P_F$(W) | 0.31 | 30.53 | 23.36 | 0.92 |
| Average output (cavity) | $P_C$(W) | 10 | 974 | 663 | 30 |
| Number of collisions per burst | zΔ | 0.5165 | 0.5165 | 0.0051 | 0.5181 |

From the above results, selective excitation apparatus 100 can be configured respectively for Case 1 and Case 4 where a small value is selected for $P_F$ (the output of the pulse light source 111), for Case 2 where a small value is selected for L (the length of the sample cell 200) and for Case 3 where the sample temperature is made low. In other words, a selective excitation apparatus according to the present invention can be adapted to the application and the mode of operation of the apparatus.

Additionally, a selective excitation apparatus according to the present invention can be adapted to irradiate of an ionizing laser beam to the sample cell 200 in the apparatus as described in Paragraph 0017 of Patent Document 2. Since such an apparatus can ionize atoms (isotopes of a specific species) in an excited molecule, the positive ions can be collected by arranging an electrode for collection and applying a negative voltage to them. Therefore, an isotope separation apparatus can be formed by using such a selective excitation apparatus. When isotopes of a specific species are obtained on the electrode for collection, they evidence that a molecule having such isotopes exists in the sample. Therefore, such an isotope separation apparatus can also be used as isotope analysis apparatus.

[Explanation Of Reference Symbols]
100: selective excitation apparatus
110: excitation light generation section
111: pulse light source
120: first interferometer
121, 122, 131, 132, 141: half mirror
123, 124, 133, 134, 140, 156: reflection mirror
125, 135: chirp adjustment section
130: second interferometer
150: irradiation section
151: polarizer
152: Pockels cell
153: entrance optical system
154: exit optical system
155: optical amplification medium
200: sample cell

What is claimed is:

1. A selective molecular excitation method of irradiating a gas with excitation light to selectively excite the molecules of a specific species in the gas, said method comprising:
    making the spectrum of excitation light a comb-shaped spectrum of a plurality of bands in an energy range so selected in advance as to include a plurality of excitation energies corresponding respectively to a plurality of rotational levels of the molecules of the specific species and the molecules other than the molecules of the specific species in the gas,
    the plurality of bands being so selected as to make all the excitation energies of the molecules of the specific species existing in the energy range to be included in the plurality of bands but some of the excitation energies of the molecules other than the specific species existing in the energy range to be not included in the plurality of bands.

2. The selective molecular excitation method according to claim 1, wherein excitation light is provided for each vibrational quantum number of the molecules of the specific species and the excitation light of each vibrational quantum number is irradiated onto the gas.

3. The selective molecular excitation method according to claim 1, wherein the interval of the central energies of adjacent ones of the plurality of bands is made equal to the difference of adjacent excitation energies of the molecules of the specific species.

4. The selective molecular excitation method according to claim 3, wherein the excitation light is so arranged that there are sequentially output the first pulse train having a comb-shaped spectrum having a plurality of bands synchronized with the excitation energies of the plurality of rotational levels of the molecules of the specific species corresponding to every other one of the rotational quantum numbers and including four pulse lights of a same phase and the second pulse train having a comb-shaped spectrum having a plurality of bands synchronized with adjacent ones of the plurality of rotational levels corresponding to every other one of the rotational quantum numbers and including four pulse lights of sequentially inverted phases.

5. The selective molecular excitation method according to claim 4, wherein a single pulse emitted from a light source is split by means of a half mirror and the split pulses are delayed by means of a plurality of interferometers and subsequently combined to produce a pulse train, the first pulse train and the second pulse train are produced by utilizing the inversion of phase taking place at the time for the pulse train to be reflected, and the excitation light is produced by delaying the second pulse train from the first pulse train and combining them.

6. The selective molecular excitation method according to claim 1, wherein a chirp adjustment selection made of an optical material having a dispersion characteristic is inserted into an optical path of the optical system for forming the excitation light to adjust the intervals of the plurality of bands of the comb-shaped spectrums.

7. An isotope separation method for separating a specific isotope from a gas containing molecules of a plurality of species, each of the species including a plurality of isotopes, said method comprising:

selectively exciting the molecules including the specific isotope by executing a selective molecular excitation method of irradiating a gas with excitation light to selectively excite the molecules of a specific species in the gas, said method comprising:

making the spectrum of excitation light a comb-shaped spectrum of a plurality of bands in an energy range so selected in advance as to include a plurality of excitation energies corresponding relatively to a plurality of rotational levels Of the molecules of the specific species and the molecules other than the molecules of the specific species in the gas, the plurality of bands being so selected as to make all the excitation energies of the molecules of the specific species existing in the energy range to be included in the plurality of bands but some of the excitation energies of the molecules other than the specific species existing in the energy range to be not included in the plurality of hands, targeting the molecules including the specific isotope as molecules of the specific species, and executing a process of ionizing or decomposing the molecules including the specific isotope in order to separate the specific isotope.

8. An isotope analysis method for analyzing the specific isotope content of a gas containing molecules of a plurality of species, each of the species including a plurality of isotopes, said method comprising:

selectively exciting the molecules including the specific isotope by executing a selective molecular excitation method of irradiating a gas with excitation light to selectively excite the molecules of a specific species in the gas, said method comprising:

making the spectrum of excitation light a comb-shaped spectrum of a plurality of hands in an energy range so selected in advance as to include a plurality of excitation energies corresponding relatively to a plurality of rotational levels of the molecules of the specific species and the molecules other than the molecules of the specific species in the gas, the plurality of bands being so selected as to make all the excitation energies of the molecules of the specific species existing in the energy range to be included in the plurality of hands but some of the excitation energies of the molecules other than the specific species existing in the energy range to be not included in the plurality of bands, targeting the molecules including the specific isotope as molecules of the specific species, and executing a process of ionizing or decomposing the molecules including the specific isotope in order to detect the specific isotope.

9. A selective molecular excitation apparatus for irradiating a gas with excitation light to selectively excite the molecules of a specific species in the gas, said apparatus comprising:

an excitation light generation section that generates excitation light having a comb-shaped spectrum of a plurality of bands in an energy range so selected in advance as to include a plurality of excitation energies corresponding respectively to a plurality of rotational levels of the molecules of the specific species and the molecules other than the molecules of the specific species in the gas, the plurality of bands being so selected as to make all the excitation energies of the molecules of the specific species existing in the energy range to be included in the plurality of bands but some of the excitation energies of the molecules other than the specific species existing in the energy range to be not included in the plurality of bands; and an irradiation section that irradiates the excitation light into a sample cell containing the gas.

10. The selective molecular excitation apparatus according to claim 9, wherein the excitation light generation section generates the excitation light for each vibrational quantum number of the molecules of the specific species and the irradiation section irradiates the excitation light of each vibrational quantum number into the sample cell.

11. The selective molecular excitation apparatus according to claim 9, wherein the interval of the central energies of adjacent ones of the plurality of bands is made equal to the difference of adjacent excitation energies of the molecules of the specific species.

12. The selective molecular excitation apparatus according to claim 11, wherein the excitation light is so arranged that there are sequentially output the first pulse train having a comb-shaped spectrum having a plurality of bands synchronized with the excitation energies of the plurality of rotational levels of the molecules of the specific species corresponding to every other one of the rotational quantum numbers and including four pulse lights of a same phase and the second pulse train having a comb-shaped spectrum having a plurality of bands synchronized with adjacent ones of the plurality of rotational levels corresponding to every other one of the rotational quantum numbers and including four pulse lights of sequentially inverted phases.

13. The selective molecular excitation apparatus according to claim 9, wherein a chirp adjustment section made of an optical material having a dispersion characteristic is inserted into the excitation light generation section to adjust the intervals of the plurality of bands of the comb-shaped spectrums.

14. The selective molecular excitation apparatus according to claim 9, wherein the irradiation section is so arranged that an optical path including the sample cell forms a resonator and an optical amplification medium is inserted in the optical path.

15. An isotope separation apparatus for separating a specific isotope from a gas containing molecules of a plurality of species, each of the species including a plurality of isotopes, the apparatus comprising:

a selective molecular excitation apparatus for irradiating a gas with excitation light to selectively excite the molecules of a specific species in the gas, said apparatus comprising:

an excitation light generation section that generates excitation light having a comb-shaped spectrum of a plurality of bands in an energy range so selected in advance as to include a plurality of excitation energies corresponding respectively to a plurality of rotational levels of the molecules of the specific species and the molecules other than the molecules of the specific species in the gas, the plurality of bands being so selected as to make all the excitation energies of the molecules of the specific species existing in the energy range to be included in the plurality of bands but some of the excitation energies of the molecules other than the specific species existing in the energy range to be not included in the plurality of bands; and an irradiation section that irradiates the excitation light into a sample cell containing the gas, targeting the molecules including the specific isotope as molecules of the specific species.

* * * * *